Dec. 18, 1962  J. W. TUMAVICUS  3,068,649
HEADER FOR LIQUID FUEL ROCKET
Filed June 25, 1959  2 Sheets-Sheet 1
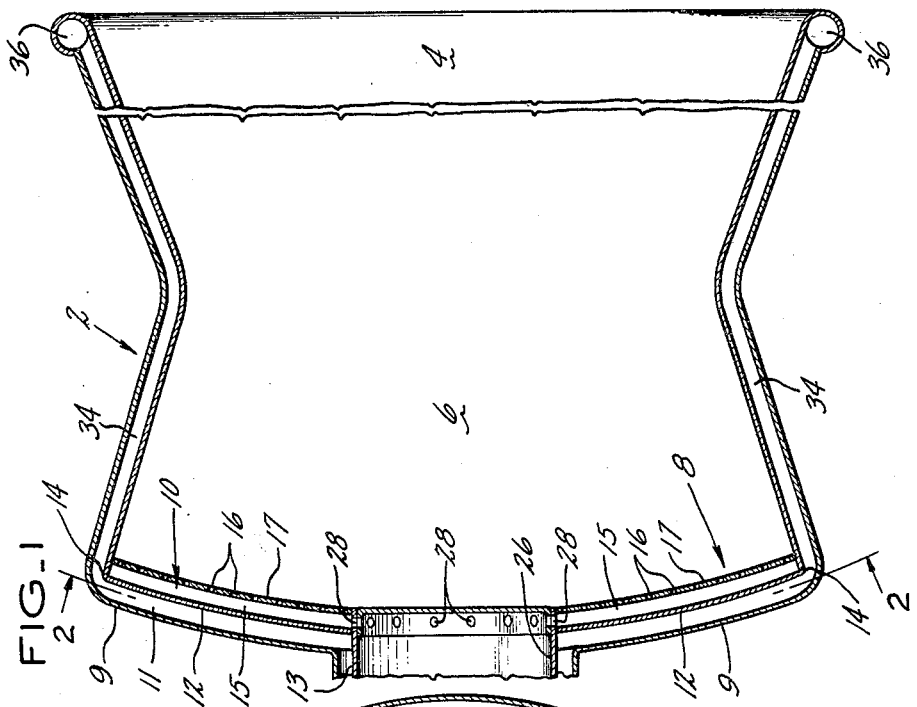
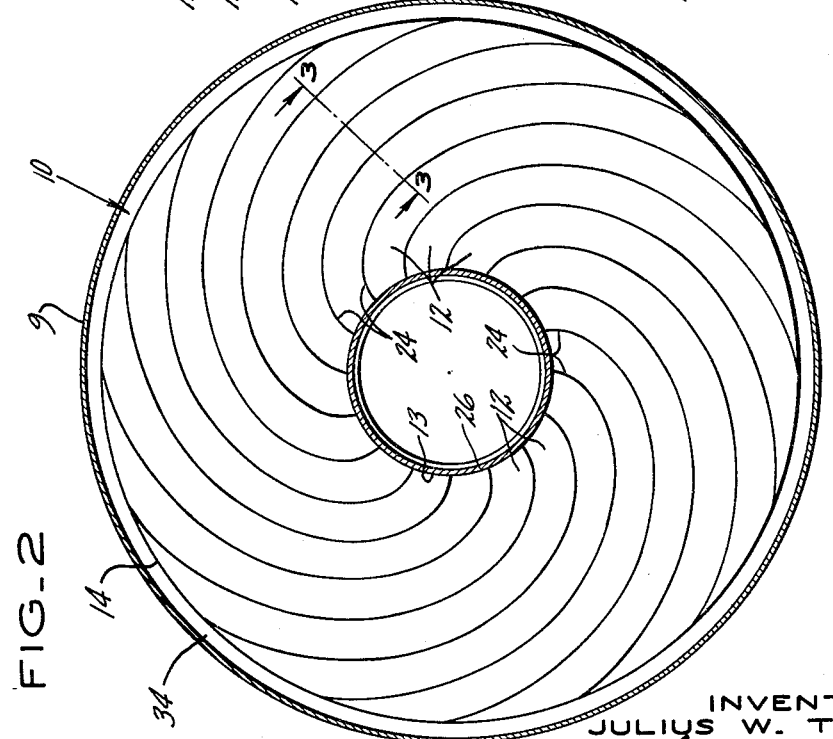
INVENTOR
JULIUS W. TUMAVICUS
BY *Charles A. Warren*
ATTORNEY Dec. 18, 1962  J. W. TUMAVICUS  3,068,649
HEADER FOR LIQUID FUEL ROCKET Filed June 25, 1959  2 Sheets-Sheet 2

INVENTOR
JULIUS W. TUMAVICUS
BY
ATTORNEY 3,068,649
HEADER FOR LIQUID FUEL ROCKET
Julius W. Tumavicus, Old Saybrook, Conn., assignor to United Aircraft Corporation, East Hartford, Conn., a corporation of Delaware
Filed June 25, 1959, Ser. No. 822,778
6 Claims. (Cl. 60—39.46)

This invention relates to an injector head for a rocket and to a method for making it.

As the dimensions of rockets increase the problems of supplying adequate propellants rapidly enough to the combustion chamber also increases. Further, with increasing dimension of the rocket the machining problems are greatly increased by reason of the limitations in the size of existing machines. One feature of this invention is an injector head which may be made up of readily formed strip material with the several strips brazed together. Another feature is an injector head in which the injector elements are formed from injector strips cut to the desired length and arranged substantially spirally to form the head. One feature of the invention is an injector strip to be used in forming these built-up injector heads.

One feature of the invention is a method for making an injector head by the use of strip material such that the head may be made to almost any desired dimension with the injector nozzles spaced uniformly over the injector head.

Other features and advantages will be apparent from the specification and claims, and from the accompanying drawing which illustrates an embodiment of the invention.

FIG. 1 is a longitudinal sectional view through a rocket.

FIG. 2 is a plan view of the injector head substantially along the line 2—2 of FIG. 1.

Figure 3:
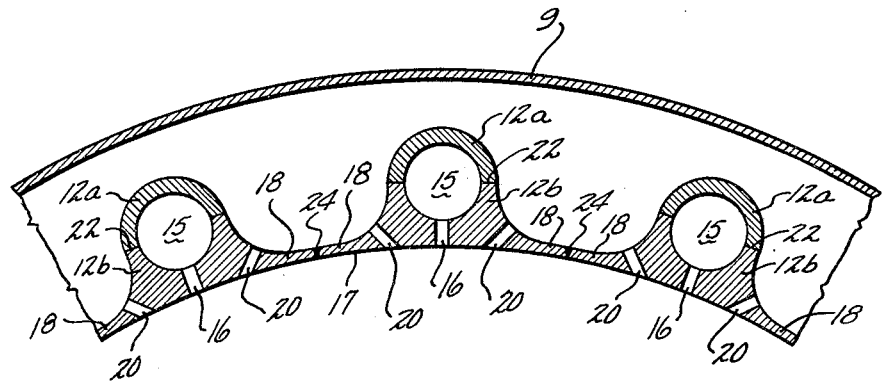
FIG. 3 is a sectional view along the line 3—3 of FIG. 2.
Figure 4:
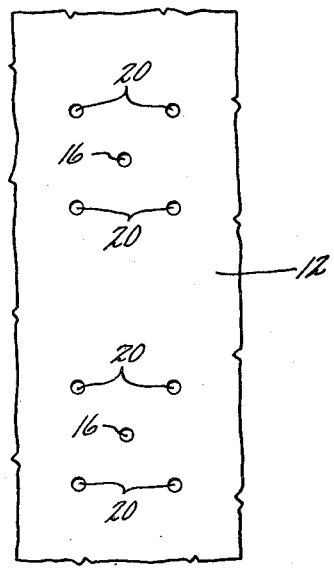
FIG. 4 is a bottom view of one of the strips of FIG. 3.

The invention is shown in a rocket having an annular wall 2 forming the nozzle portion 4 of the rocket and also forming the side wall of the combustion chamber 6. The end of the annular wall 2 is closed by an injector head 8 through which the propellants are supplied to the combustion chamber. The injector head includes a cap 9 and a header 10 in spaced relation to form a chamber 11.

The header 10, as shown in FIG. 2, is made up of a plurality of strips 12 each of which is arranged in a substantially spiral shape within the header. Each strip extends outwardly from a central opening 13 to the periphery 14 of the head. All the strips have the same cross-sectional shape and area and each strip has a longitudinal passage 15, FIG. 3, for the supply of one of the propellants longitudinally of the strip to be discharged through nozzles 16 communicating with the undersurface 17 of the strip.

The strip is preferably in the form of a tube defining the wall of the passage 15 and having opposed flanges 18 thereon. The opposed flanges 18 form a substantially continuous undersurface 17 for the strip. This undersurface is preferably slightly curved transversely to accommodate it to the curvature of the header, as will be apparent.

Passing through the flanges 18 and preferably arranged symmetrically around each nozzle 16 are a plurality of bores or nozzles 20 through which a propellant from the chamber 11 overlying the upper surface of the strip may be discharged through the strip in a symmetrical configuration with the other propellant discharging through the nozzles 16. The nozzles 16 and the bores 20 are formed in the strip material during its manufacture and at appropriately spaced locations longitudinally of the strip. The longitudinal spacing of the sets of nozzles together with the width of the strip will determine the number and closeness of the sets of the injector nozzles in the assembled injector head.

With an arrangement of this character the strip material forming the injector header may be made, for example, by an extrusion process or by a rolling process, being preferably made up of two separate sections 12a and 12b which are welded or brazed together along the lines 22. It may in certain cases be desirable to form the part 12a so that it will vary in depth longitudinally of the strip. This will make possible a variation in area of passage 15 from inner end to outer end of each spirally arranged strip should this be desirable for flow purposes.

As above stated, several strips 12, all duplicates of one another and all shaped as above described, are curved spirally to form the injector header and are arranged on such a spiral that the edges of adjacent strips are in contact with each other. The strips are then brazed together as at 24 to form the assembled injector head.

After the assembly of the strips together to form the header, the inner ends of the strips may all be attached to a sleeve 26 which fits in the central opening 13. The sleeve 26 has an end cap 27 and both sleeve and cap have aligned openings 28 therein communicating with the passages 15 for a supply of a first propellant through these passages to the nozzles 16. This first propellant is supplied to the sleeve 26 from an external source, not shown. The cap 9 is placed over the assembled strips in spaced relation thereto to form the chamber 11. A second propellant introduced into chamber 11 is discharged through the openings 20.

The chamber 11 may communicate with longitudinal passages 34 in the side wall 2 of the rocket, as best shown in FIG. 1. The same side wall 2 of the rocket may be brazed or otherwise secured to the outer ends of the strips 12, that is to say, to the periphery 14 of the header thereby closing off the outer ends of the passages 15 in the strips.

With an arrangement of this character, the downstream end of the side wall 2 of the rocket may have a manifold 36 for introduction of the second propellant therein so that the flow of this propellant through the walls 2 will serve to cool the walls while the rocket is in operation. This propellant reaches chamber 11 through the passages 34 as above described.

It will be understood that the strips 12 may most easily be formed to the spiral configuration desired if the header into which the strips are assembled is a portion of a sphere. In this event the undersurface of the strips should be curved to conform substantially to the radius of the portion of the sphere to which the header conforms. It is also possible with an arrangement of this character to form the strips into a header having a shape conforming to a substantial part of a sphere such as a hemispherical configuration or even to more than a hemisphere should it be necessary to have a header with as large an area to permit the introduction of the necessary quantities of propellants.

It is to be understood that the invention is not limited to the specific embodiment herein illustrated and described, but may be used in other ways without departure from its spirit as defined by the following claims.

I claim:

1. An injector head for a rocket, including several narrow elongated strips each arranged in side-by-side relation in a spiral to form the header with the edges of adjacent strips in contact and attached together to form a well, each strip having a central longitudinal passage therein and longitudinally spaced transverse openings from one surface of the strip to the central passage and each strip having an integral flange thereon for establishing the spacing of adjacent strips, the flange having nozzle forming passages therethrough for discharge of a propellant therethrough, and a cap extending over said header to form a propellant chamber therebetween.

2. An injector head as in claim 1 in which the head conforms in shape substantially to a section of a sphere.

3. An injector head as in claim 1 in which all the strips have the same substantially uniform cross-sectional configuration throughout their lengths.

4. An injector head as in claim 1 in which the narrow strips are in the form of a tube with opposed flanges thereon with the opposite flanges of adjacent strips in edge-to-edge contact.

5. An injector head as in claim 1 in which the narrow strips are in the form of a tube with opposed flanges thereon with the opposite flanges of adjacent strips in edge-to-edge contact, said nozzle forming passages being in symmetrical arrangement to said transverse openings.

6. An injector head for a rocket including a central sleeve forming a first propellant chamber and having a ring of circumferentially positioned apertures therein, several narrow elongated strips each attached at one end to said sleeve and extending therefrom as a contiguous spiral to form a header with adjacent strips in edge-to-edge contact and attached together, a cap extending over said header to form a second propellant chamber therebetween, said strips having first traverse passages therethrough for the discharge of propellant from said second propellant chamber through said strips and each having a longitudinal passage therethrough communicating with one of said sleeve apertures and hence said first propellant sleeve and having second traverse passages therethrough communicating with said longitudinal passage and hence said first propellant sleeve for the discharge of propellant from said first propellant sleeve through said strips.

References Cited in the file of this patent

UNITED STATES PATENTS

| | | |
|---|---|---|
| 2,443,577 | Finlay | June 15, 1948 |
| 2,703,962 | Olson | Mar. 15, 1955 |
| 2,733,570 | Macpherson | Feb. 7, 1956 |
| 2,734,259 | Beck | Feb. 14, 1956 |
| 2,753,687 | Wissley et al. | July 10, 1956 |
| 2,808,701 | Lewis | Oct. 8, 1957 |
| 2,928,236 | Kircher et al. | Mar. 15, 1960 |

FOREIGN PATENTS

| | | |
|---|---|---|
| 21,066 | Great Britain | Nov. 19, 1892 |